US008999547B2

(12) United States Patent
Cha et al.

(10) Patent No.: US 8,999,547 B2
(45) Date of Patent: Apr. 7, 2015

(54) BATTERY MODULE

(75) Inventors: In-Hwan Cha, Yongin-si (KR); Kwon Sohn, Yongin-si (KR); Seung-Woo Yang, Yongin-si (KR); Min-Kyun Mok, Yongin-si (KR)

(73) Assignees: Samsung SDI Co., Ltd., Yongin-Si, Gyeonggi-Do (KR); ROBERT BOSCH GmbH, Stuttgart (DE)

( * ) Notice: Subject to any disclaimer, the term of this patent is extended or adjusted under 35 U.S.C. 154(b) by 0 days.

(21) Appl. No.: 13/572,816

(22) Filed: Aug. 13, 2012

(65) Prior Publication Data
US 2013/0164576 A1 Jun. 27, 2013

Related U.S. Application Data

(60) Provisional application No. 61/579,348, filed on Dec. 22, 2011.

(51) Int. Cl.
*H01M 10/50* (2006.01)
*H01M 10/613* (2014.01)
*H01M 10/6554* (2014.01)
*H01M 10/6556* (2014.01)
*H01M 2/10* (2006.01)
*H01M 10/647* (2014.01)

(52) U.S. Cl.
CPC ........ *H01M 10/5004* (2013.01); *H01M 2/1088* (2013.01); *H01M 10/5032* (2013.01); *H01M 10/5053* (2013.01); *H01M 10/5057* (2013.01)

(58) Field of Classification Search
None
See application file for complete search history.

(56) References Cited

U.S. PATENT DOCUMENTS

| 2008/0311468 | A1* | 12/2008 | Hermann et al. | 429/120 |
| 2011/0003187 | A1 | 1/2011 | Graaf et al. | |
| 2011/0206948 | A1 | 8/2011 | Asai et al. | |
| 2012/0009455 | A1* | 1/2012 | Yoon | 429/120 |
| 2012/0183831 | A1* | 7/2012 | Jeong et al. | 429/120 |
| 2012/0244392 | A1* | 9/2012 | Kleiman et al. | 429/50 |
| 2012/0321928 | A1* | 12/2012 | TenHouten et al. | 429/120 |

FOREIGN PATENT DOCUMENTS

| DE | 10 2010 029 872 A1 | 1/2011 |
| DE | 10 2010 013 025 A1 | 9/2011 |
| EP | 2 343 769 A1 | 7/2011 |
| EP | 2 362 463 A2 | 8/2011 |
| JP | 2003-036819 | 2/2003 |
| KR | 10-2002-0069728 A | 9/2002 |
| KR | 10-2008-0083893 A | 9/2008 |

OTHER PUBLICATIONS

European Search Report in EP 12181032.9-1360, dated Mar. 27, 2013 (Cha, et al.).

* cited by examiner

*Primary Examiner* — Patrick Ryan
*Assistant Examiner* — Carmen Lyles-Irving
(74) *Attorney, Agent, or Firm* — Lee & Morse, P.C.

(57) ABSTRACT

A battery module includes a plurality of battery cells, and a heat exchanging member adjoining the plurality of battery cells in heat exchanging relationship therewith. The heat exchanging member includes a plurality of tubes arranged therein, and each tube defines a plurality of heat exchanging medium flow passageways therein.

17 Claims, 7 Drawing Sheets

BATTERY MODULE

CROSS-REFERENCE TO RELATED APPLICATION

The present application claims priority under 35 U.S.C. §119(e) to U.S. Provisional Application No. 61/579,348, filed on Dec. 22, 2011, and entitled: "Battery Module," which is incorporated herein by reference in its entirety.

BACKGROUND

High output battery modules using, e.g., a non-aqueous electrolyte of high energy density, have been developed. The high output battery module may include a plurality of battery cells connected in series to drive a machine with a high power, e.g., to drive a motor of an electric automobile.

The plurality of battery cells in the battery module may transfer energy to an external electronic device using an electrochemical reaction. In this case, the battery cells may each generate heat during the electrochemical reaction, and when the heat is accumulated, the battery cells may be degraded. In severe cases, a safety problem may occur due to the heat. Therefore, various studies have been made to control a temperature of the battery cells.

SUMMARY

Embodiments may be realized by providing a battery module including a plurality of battery cells, and a heat exchanging member adjoining the plurality of battery cells in heat exchanging relationship therewith. The heat exchanging member includes a plurality of tubes arranged therein and each tube defines a plurality of heat exchanging medium flow passageways therein.

The heat exchanging member may include a member accommodating the plurality of tubes therein. The member may include a lower member arranged adjacent to first sides of the plurality of tubes, and an upper member arranged between the plurality of battery cells and second sides of the plurality of tubes. The second sides may oppose the first sides of the plurality of tubes. The lower member may include a plastic and the upper member may include a metal.

The battery module may further include a filler covering the plurality of tubes and the member. The filler may be arranged between the plurality of battery cells and the plurality of tubes.

The heat exchanging member may further including a first buffer portion connected to first ends of the plurality of the plurality of tubes, and a second buffer portion connected to second ends of the plurality of the tubes. The second ends may oppose the first ends. The heat exchanging member may include a member accommodating the plurality of tubes, and the member may be arranged between the first buffer portion and the second buffer portion.

The first buffer portion may include a heat exchange medium inlet connected to the plurality of heat exchanging medium flow passageways of each of the plurality of tubes. The second buffer portion may include a heat exchange medium outlet connected to the plurality of heat exchanging medium flow passageways of each of the plurality of tubes.

The first buffer portion may include a plurality of first openings and each of the first openings may correspond to one of the plurality of tubes. The second buffer portion may include a plurality of second openings and each of the second openings may correspond to one of the plurality of tubes.

The plurality of battery cells may be arranged in a region between the first buffer portion and the second buffer portion. The plurality of battery cells may overlap the plurality of tubes. The plurality of battery cells may be arranged along a first direction and the plurality of tubes may be arranged along the first direction, and each of the battery cells may overlap one of the plurality of tubes. The plurality of tubes may have an elliptical shape, and a width of a lower surface of each of the plurality of battery cells may be substantially equal to a width of each of the plurality of tubes.

Each of the plurality of tubes may include lateral sides that are aligned with respective lateral sides of one of the plurality of battery cells. The plurality of heat exchanging medium flow passageways in each tube may be defined by at least one partition therein. Each tube and the at least one partition therein may have a one piece integral construction.

The plurality of battery cells may be arranged adjacent to each other along a first direction. The plurality of tubes may be arranged adjacent to each other along the first direction. The at least one partition may be one of a plurality of partitions and the plurality of partitions may be arranged adjacent to each other along the first direction.

The heat exchanging member may include a member. The member may include a lower member under the plurality of tubes. The lower member may include support portions on opposing sides thereof, and the plurality of tubes may be arranged between the support portions. The plurality of battery cells may be arranged above the plurality of tubes and may be arranged in a non-overhanging relationship with the support portions.

The heat exchanging member may further include a member. The member may be directly coupled to the plurality of tubes, and the member may be directly coupled to a lower surface of each of the plurality of battery cells or may be directly coupled to a filler on the lower surface of each of the plurality of battery cells.

The plurality of battery cells may overlap upper surfaces of the plurality of tubes, the heat exchanging member may include a member having a lower member covering lower surfaces of the plurality of tubes, and the heat exchanging member may include a first buffer portion and a second buffer portion. The member and the plurality of tubes may be arranged between the first and second buffer portions, and the first and second buffer portions may be adjacent to each of the plurality of battery cells.

The heat exchanging member may include a compartment portion recessed from an upper surface of the heat exchanging member, the plurality of battery cells may be seated within the compartment portion, the plurality of tubes may be arranged under the compartment portion, and a first buffer portion and a second buffer portion of the heat exchanging member may surround the compartment portion. The first and second buffer portions may define the upper surface of the heat exchanging member.

Embodiments may also be realized by providing a battery module that includes an electrically connected plurality of battery cells, and a heat exchanging member provided adjacent to the battery cell. The heating exchanging member includes at least one tube and a frame covering the tube. The tube includes a plurality of flow paths formed by a partition at the inner portion of the tube.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
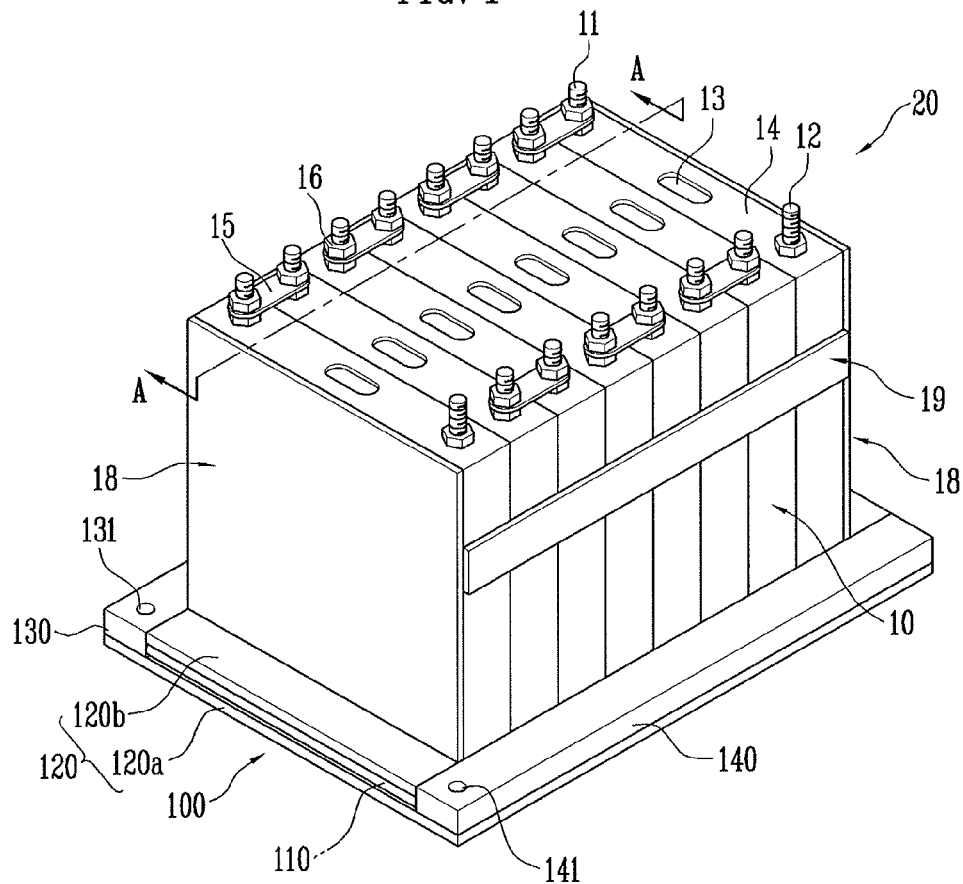
FIG. 1 illustrates a perspective view showing a battery module, according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Embodiments are intended to cover various modifications and equivalent arrangements included within the spirit and scope of the appended claims, and equivalents thereof.

The drawings figures and description are to be regarded as illustrative in nature and not restrictive. In the drawing figures, the dimensions of layers and regions may be exaggerated for clarity of illustration. Like reference numerals refer to like elements throughout.

It will also be understood that when a layer or element is referred to as being "on" another layer or substrate, it can be directly on the other layer or element, or intervening layers or elements may also be present. Further, it will be understood that when a layer or element is referred to as being "under" another layer or element, it can be directly under, and one or more intervening layers or elements may also be present. In addition, it will also be understood that when a layer or element is referred to as being "between" two layers or elements, it can be the only layer between the two layers or elements, or one or more intervening layers or elements may also be present.

FIG. 1 illustrates a perspective view showing a battery module, according to an exemplary embodiment.

The battery module 20 according to an exemplary embodiment includes a plurality of battery cells 10 that are electrically connected. A heat exchanging member 100 may be provided adjacent to the battery cell 10, e.g., the heat exchanging member 100 may be provided under all of the battery cells 10. The heat exchanging member 100 may include at least one tube 110 and a frame member 120 covering the tube 110. The tube 110 may have an inner portion thereof including a plurality of the flow path formed therein by at least one partition 111. The heating exchanging member 100 may include a plurality of the tubes 110 arranged in parallel to each other under the battery cells 10 of the battery module 20. The heat exchanging member 100 may support bottom surfaces of the plurality of battery cells 10.

The tubes 110 may each have a size that corresponds to bottom surface of the battery cells 10, e.g., a width and/or length of one tube 110 may correspond to a width and/or length of a correspond battery cell 10 arranged above the tube 110. A material of tubes 110 may include a metal, e.g., the metal may include at least one of copper, aluminum, and stainless steel. According to an exemplary embodiment, the tubes 110 may be parallel flow condenser tubes.

The battery cell 10 may include a cap plate 14 provided with a terminal portion. The cap plate 14 may be connected to terminals 11 and 12, which may extend from an inside of the battery cell 10 to an outside, as illustrated in FIG. 1. The battery cell 10 may include a bottom surface 17 provided opposite to the cap plate 14 (see FIG. 3). The heat exchanging member 100 may be provided to support the bottom surface 17 of the battery cell 10. The heat exchanging member 100 may support the bottom surfaces 17 of each of the plurality of battery cells 10.

Referring to FIG. 1, the battery cell 10 may include a battery case having one open surface, which may be later covered. An electrode assembly and an electrolyte may be housed within the battery case. The electrode assembly and the electrolyte may generate energy by an electrochemical reaction. The battery case may be sealed by the cap plate 14, e.g., the open surface of the battery case may be sealed by the cap plate 14.

The cap plate 14 may include via holes through which the terminal portions 11 and 12 may extend therethrough. The terminal portions 11 and 12 may form a cathode terminal 11 and an anode terminal 12 having different polarities. The cathode terminal 11 and the anode terminal 12 of the adjacent battery cells 10 may be electrically connected through a bus bar 15. The bus bar 15 may be fixed to the cathode terminal 11 and the anode terminal 12 with a member such a nut 16 and/or the like. The cap plate 14 may include a vent portion 13 between the via holes of the terminal portions 11 and 12. The vent portion 13 may be a safety means and may serve as a path for discharging gas generating from an inner portion of the battery cell 10 to the outside.

The battery cells 10 may be severally arranged, e.g., may be arranged in parallel to each other. At least one of plates 18 and 19 may be used for fixing an alignment state of the battery cells 10. The plates 18 and 19 may be provided in plurality to be opposite each other, e.g., may be arranged on opposing ends of the plurality of battery cells 10 arranged in parallel to each other. For example, a pair of end plates 18 may be provided facing wide surfaces of the battery cells 10. A pair of side plates 19 may be provided adjacent to side surfaces of the battery cells 10. The pair of side plates 19 may be connected to the pair of end plates 18. The plates 18 and 19 may fix the plurality of battery cells 10 and may be modified in various ways depending on a design of the battery module 20.

Figure 2A:
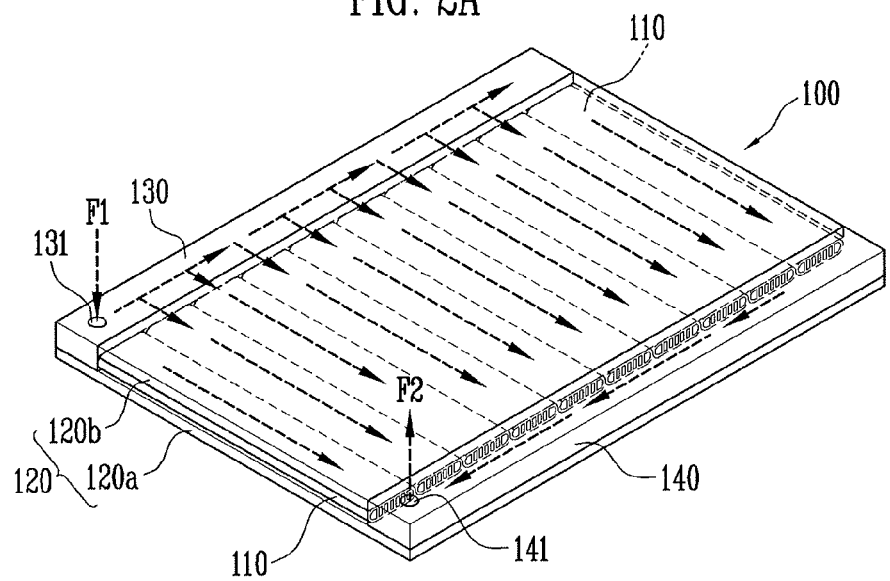
FIG. 2A illustrates a schematic view showing a flow path of a heat exchanging medium through a heat exchanging member.
Figure 2B:
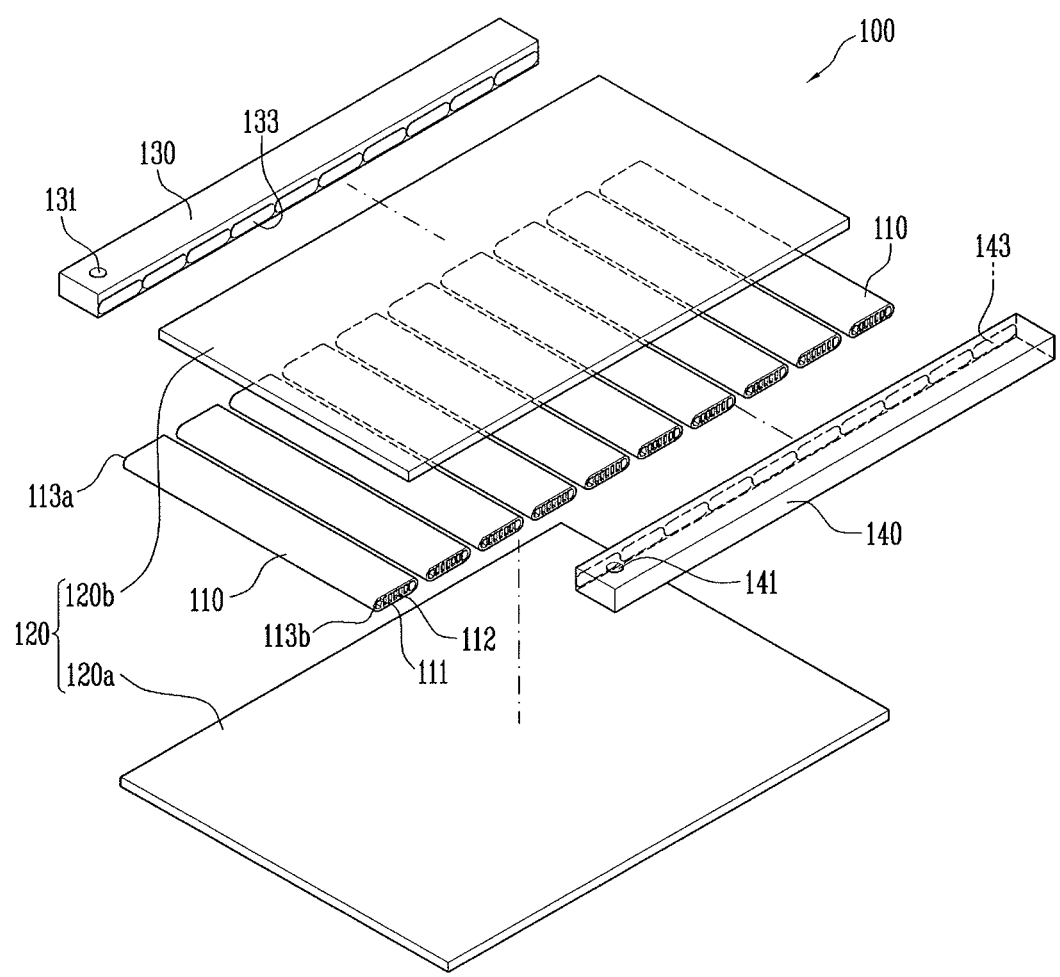
FIG. 2B illustrates an exploded perspective view of a heat exchanging member, according to an exemplary embodiment.

FIG. 2A illustrates a schematic view showing a flow path of a heat exchanging medium through a heat exchanging member. FIG. 2B illustrates an exploded perspective view of a heat exchanging member, according to an exemplary embodiment.

Referring to FIG. 2A and FIG. 2B, the heat exchanging member 100 may be provided to support bottom surfaces 17 (see FIG. 3) of the battery cells 10. The heat exchanging member 100 may include the frame member 120, a first buffer portion 130, and a second buffer portion 140 that form outermost surfaces of the heat exchanging member 100. The first and second buffer portions 130 and 140 may be formed on the frame member 120. The outermost surfaces of the heat exchanging member 100 may wrap, e.g., enclose, the plurality of tubes 110 arranged in parallel to each other.

The first buffer portion 130 may be provided to cover one end 113a of the tube 110, e.g., the first buffer portion 130 may cover the ends 113a of each of the tubes 110 arranged in parallel to each other. The first buffer portion 130 may include an inlet 131, e.g., at one side thereof, into which the heat exchanging medium flows (F1) flows so as to provide the ends 113a of the tubes 110 with the heat exchanging medium. The second buffer portion 140 may be provided to cover the other end 113b of the tube 110, e.g., the second buffer portion 140 may cover the ends 113b of each of the tubes 110 arranged in parallel to each other. The second buffer portion 140 may include an outlet 141, e.g., at one side thereof, out of which the heat exchanging medium flows so as to provide an exit path for the heat exchanging medium from the ends 113b of the tubes 110. The inlet 131 and the outlet 141 may be provided on the same sides of the first and second buffer portions 130 and 140, respectively. For example, the heat exchanging medium includes at least one of ethylene glycol and propylene glycol as a refrigerant.

The tube 110 may be variously formed, e.g., long side portions of the tubes 110 may be provided to face each other in parallel and may be supported by the frame member 120. For example, outermost casings of the tubes 110 may be a layer, e.g., a continuous layer, having a width direction and a length direction. The width direction may be along short sides of the tubes 110 and each of the tubes 110 may be arranged adjacent to each other in the width direction. The length direction may be along long sides of the tubes 110 and the long sides of the tubes 110 may extend in a direction between, e.g., directly between, the first and second buffer portions 130 and 140. A width of the short side of one tube 110 may correspond to, e.g., may be substantially equal to, a width of a short side of the battery cell 10 overlapping the one tube 110. A length of the long side of the one tube 110 may correspond to, e.g., may be substantially equal to, a length of a long side of the battery cell 10 overlapping the one tube 110. Accordingly, the one tube 110 may completely overlap the battery cell 10.

The tube 110 may include at least one partition in an inner portion thereof. Between the at least one partition 111, a plurality of the flow paths 112 defined by the at least one partition 111 may be formed at the inner portion of the tube 110. The flow paths 112 may serve as a path through which a heat exchanging medium flows in a direction across the bottom surface 17 of the battery cell 10. A material of the tube 110 may include at least one of copper, aluminum, and stainless steel. The tube 110 may have an elliptical shape, e.g., a maximum width along a traverse axis thereof may be substantially equal to a width in the width direction of the battery cell 10. For example, the tube 110 may be the parallel flow condenser tubes (PFC tube). The at least one partition 111 may be a plurality of partitions 111 arranged adjacent to each other in the width direction along the short side of the tube 110. The at least one partition 111 may be integrally formed with the outermost casing of the tube 110 so as to have a one piece integral construction. Each tube 110 may be an extruded piece that is inserted into the frame member 120 of the heat exchanging member 100.

The frame member 120 may be provided at the outermost surface of the heat exchanging member 100. The frame member 120 may include first and second frame members 120a and 120b that may form a lower member and an upper member, respectively, of the frame member 120. The first frame member 120a may be under the first and second buffer portions 130 and 140. The second frame member 120b may abut upper lateral portions of the first and second buffer portions 130 and 140.

The frame member 120 may include the first frame member 120a supporting the tube 110 and the second frame member 120b provided between tubes 110 and the battery cells 10. The first frame member 120a may be located at the lower portion of the heat exchanging member 110 so as to form the lowermost member of the frame member 120. The second frame member 120b may abut the bottom surfaces 17 of the battery cells 10. The first and second frames members 120a and 120b may protect the tubes 110 and may serve to provide a predetermined stiffness of the heat exchanging member 100 to the plurality of battery cells 10.

A thickness and a material of the frame member 120 may be appropriately modified in accordance with a use condition. The thickness and the material of the first and second frame members 120a and 120b may be provided differently. Accordingly to an exemplary embodiment, the frame member 120 may be made of plastic, a metal such as stainless steel, etc. For example, the first frame member 120a may be made of plastic and the second frame member 120b may be made of a metal such as stainless steel. The first frame member 120a made of the plastic may reduce the possibility of and/or prevent a heat exchange with the outside caused by, e.g., a lower insulation effect for the heat exchanging medium. The second frame member 120b made of a metal such as stainless steel may have a good heat transfer effect, thereby improving a heat exchanging efficiency between the battery cell 10 and the heat exchanging medium. The heat exchanging medium circulating the heat exchanging member 100 may perform heat exchange only for the battery cell, thereby improving a heat exchanging efficiency.

The first and second buffer portions 130 and 140 may be provided on the first frame member 120a and may be provided to cover one end 113a and another end 113b of the tube 110, respectively. The first buffer portion 130 may be provided with the inlet 131 into which the heat exchanging medium flows (F1) and a plurality of first opening portions 133 that correspond to the ends 113a of the tubes 110. For example, each of the ends 113a of the tubes 110 may be affixed to a corresponding one of the first opening portions 133 to provide fluid communication therewith. The second buffer portion 140 may be provided with the outlet 141 out which the heat exchanging medium flows (F2) and a plurality of second opening portions 143 that correspond to the ends 113b of the tubes 110. For example, each of the ends 113b of the tubes 110 may be affixed to a corresponding one of the second opening portions 143 to provide fluid communication therewith.

The first and second buffer portions 130 and 140 may be provided at opposing ends of the first frame member 120a, e.g., may be disposed on the opposing ends of the first frame member 120a so that the first frame member 120a supports the first and second buffer portions 130 and 140. The first and second opening portions 133 and 143 may be provided to face each other with the tubes 110 therebetween, e.g., one end of each tube may be attached or adhered to the first buffer portion 130 and the other end of each tube may be attached or adhered to the second buffer portion 140. The first and second buffer portions 130 and 140 may cover lateral side surfaces of the tubes 110. According to an exemplary embodiment, the first buffer portion 130 may be a distributor portion of the heat exchanging medium and the second buffer portion 140 may be a collector portion of the heat exchanging medium.

Since the one end 113a and the other end 113b of the tube 110 may be connected with the first and second opening portions 133 and 143, the heat exchanging medium flowing (F1) through the inlet 131 of the first buffer portion 130 may flow through the first opening portion 133 of the first buffer portion 130 to the flow paths 112 of each tube 110. The flow paths 112 may be defined by the at least one partition 111 so that the heat exchanging medium flows from the first opening portions 133 to each of the flow paths 112 within the tube 110. The heat exchanging medium passed through the tube 110 may be discharged through the second opening portion 143 of the second buffer portion 140 and flows out (F2) through the outlet 141.

In order to control a temperature of the battery cell 10, a heat exchanging member, the heat exchanging member 100, may be used with the battery module 20. For example, a flow path into which the heat exchanging medium flows may be used to perform a heat exchange for the battery cells 10 and these flow paths should be provided within the heat exchanging member.

In a related art, a heat exchanging member may include three plates, e.g., an upper plate, a lower plate, and an intermediate plate, that are manufactured by brazed and that provide cooling water. Flow path through which the cooling water flows should be formed, e.g., the intermediate plate includes a plate for blocking a plurality of partition and the partition of the upper and lower portion. Each partition is bonded to the plate blocking the upper and lower portion of the partition by the brazing. The brazing is a mean for adhering two or more members to each other. When an alloy having a low melting point is located between members intended to be adhered to each other, heat is provided on the alloy so that the alloy is melted and the heat is provided on the members intended to be adhered (the members are not melted), thereby adhering the members to each other.

The three plates must have a predetermined thickness or more to perform the brazing using the heat exchanging member manufactured by brazing the upper plate, the lower plate, and the intermediate plate. A high technology for the brazing applicable to a large size needs to be applied for forming a heat exchanging member for the battery module. In particular, in the intermediate plate, a high brazing technology is required to adhere the partition to a plate blocking the upper and lower portions and a narrow interval between the partitions generates frequent defects during the adhering process. The three plates should also use an expensive aluminum and the heat exchanging member provided by adhering the three plates do not have the necessary stiffness, thereby an auxiliary supporting member is also be required. Accordingly, it is difficult since the thickness of the heat exchanging member is restricted to a predetermined thickness, but due to the brazing process a volume and a weight are increased and a production cost is increased.

The battery module 20, according to an exemplary embodiment, may reduce a volume and a weight of the battery module 20 using the heat exchanging member 100. For example, the heat exchanging member 100 may be manufactured by the thin film rather than the technology such as the brazing and the like.

Figure 3:
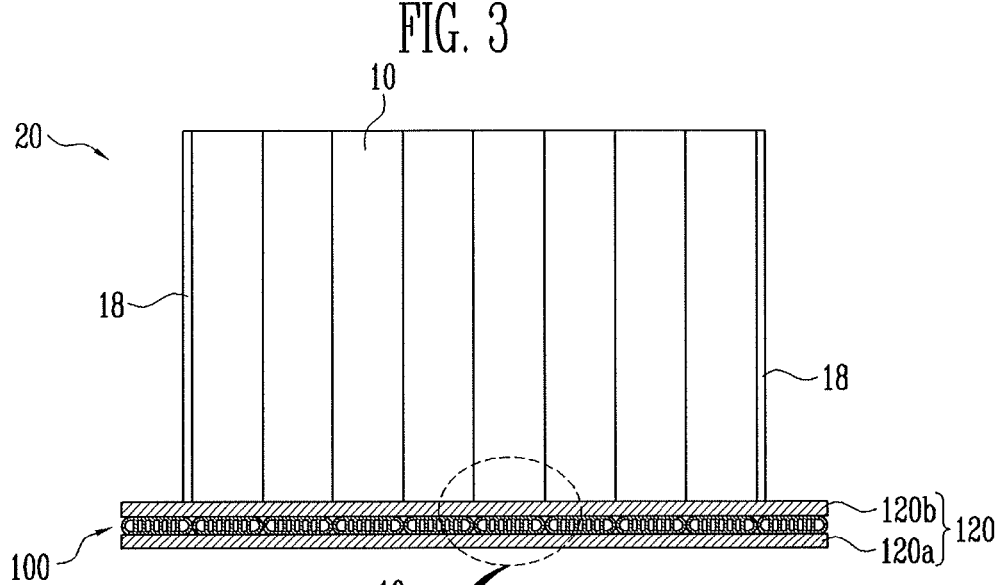
FIG. 3 illustrates a cross sectional view taken along line A-A in FIG. 1.

FIG. 3 illustrates a cross sectional view taken along line A-A in FIG. 1.

Referring to FIG. 3, in the battery module 20, the bottom surface 17 of the battery cell 10 is provided on the heat exchanging member 100. The battery cell 10 may be severally formed and each battery cell 10 may be provided to correspond to each tube 110 provided within the heat exchanging member 100.

The heat exchanging member 100 may be provided to support the bottom surface 17 of the battery cell 10, to perform a heat exchange for the battery cell 10, and to control a temperature of the battery cell 10. The heat exchanging member 100 includes the tube 110 so that the heat exchanging member 100 may make the heat exchanging medium cyclic. The heat exchanging medium may flow into the inlet 131 of the first buffer portion 130, may circulate within the tube 110 while passing through the tube 110, and may be discharged through the outlet 141 provided at the second buffer portion 140.

The heat exchanging medium flowing within the tube 110 may be provided adjacent to the battery cell 10 and may perform a heat exchange for the battery cell 10. The tube 110 may be provided to have a size corresponding to the bottom surface 17 of the battery cell 10. The inner portion of the heat exchanging member 100 may be arranged in a parallel with the plurality of tubes 100 and may be provided to be in a one to one relation with the tube 110 and the bottom surface 17 of the battery cell 10. The flow paths 112 of the heat exchanging medium performing the heat exchange for the battery cell 10 may be formed within each tube 110 in the heat exchanging member 100. Therefore, when the tube 110 and the battery cell 10 are provided to be in the one to one relation, the battery cell 10 may improve a heat exchanging efficiency.

As described below, other exemplary embodiments will be described with reference to FIGS. 4 to 8. The other exemplary embodiments are similar to the exemplary embodiment discussed above with reference to FIGS. 1 to 3, and mainly differences therebetween will be separately discussed.

Figure 4:
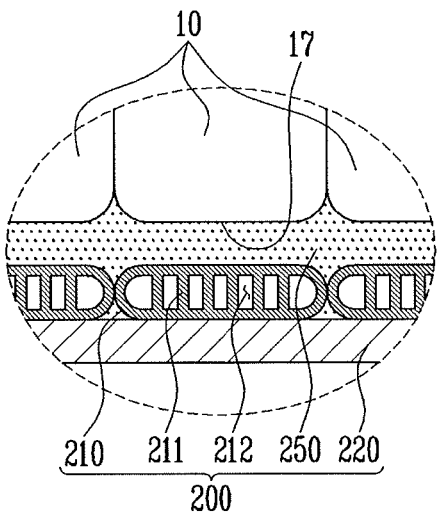
FIG. 4 illustrates a cross sectional view showing a battery cell and a heat exchanging member, according to an exemplary embodiment.

FIG. 4 illustrates a cross sectional view showing a battery cell and a heat exchanging member, according to an exemplary embodiment. Referring to FIG. 4, the heat exchanging member 200 may be provided to support the bottom surface 17 of the battery cell 10.

The heat exchanging member 200 may include the plurality of tubes 210 provided in parallel each other, the frame 220 provided on the bottom surface of the heat exchanging member 200 to support the bottom surfaces of the plurality of tubes 210 and to support the first and second buffer portions 130 and 140 (not shown in FIG. 4). The tubes 210 may each include at least one partition 211 therein that defines a plurality of flow paths 212 therethrough.

The heat exchanging member 200 may further include a filler 250. The filler 250 may be provided between the tubes 210 and the battery cells 10. The filler 250 may fill an empty space between the heating exchanging member 200 and the battery cells 10. Further, the filler 250 may fill the empty space between the frame 220 and the tubes 210. The filler 250 may be formed directly on the bottom surfaces 17 of the battery cells 10 and directly on upper surfaces of the tubes 210. The filler 250 may also fill an area between the tubes 210 so that a portion of the filler 250 is directly on a frame member 220. The filler 250 may also fill an area between bottom surfaces 17 of adjacent battery cells 10. According to an exemplary embodiment, when the filler 250 is used, an upper frame member of the frame member 220 may be excluded.

The heat exchanging member 200 according to the embodiment may consist of the filler 250 between the battery cells 10 and the tubes 210. The filler 250 may have an elastic property, e.g., may be flexible. The heat exchanging member 200 may be formed adjacent to the bottom surfaces 17 of the battery cells 10 without a standoff space, e.g., a void, therebetween. Accordingly, the filler 250 may fill various empty spaces provided by shapes of the battery cells 10, shapes of the tubes 210, and a shape of the frame 220. The filler 250 may provide an improved stiffness of the heat exchanging member 200 and may improve the heat exchanging efficiently.

Figure 5:
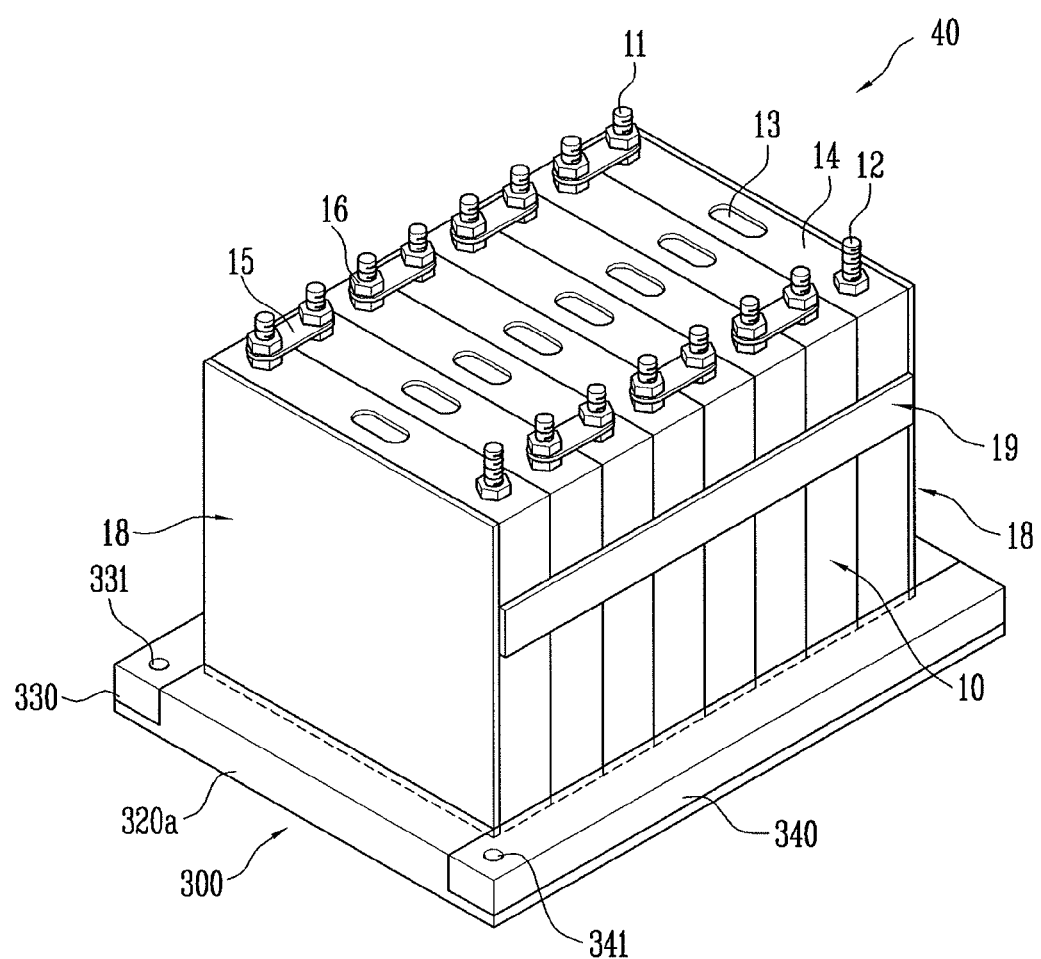
FIG. 5 illustrates a perspective view of a battery module, according to an exemplary embodiment.
Figure 6:
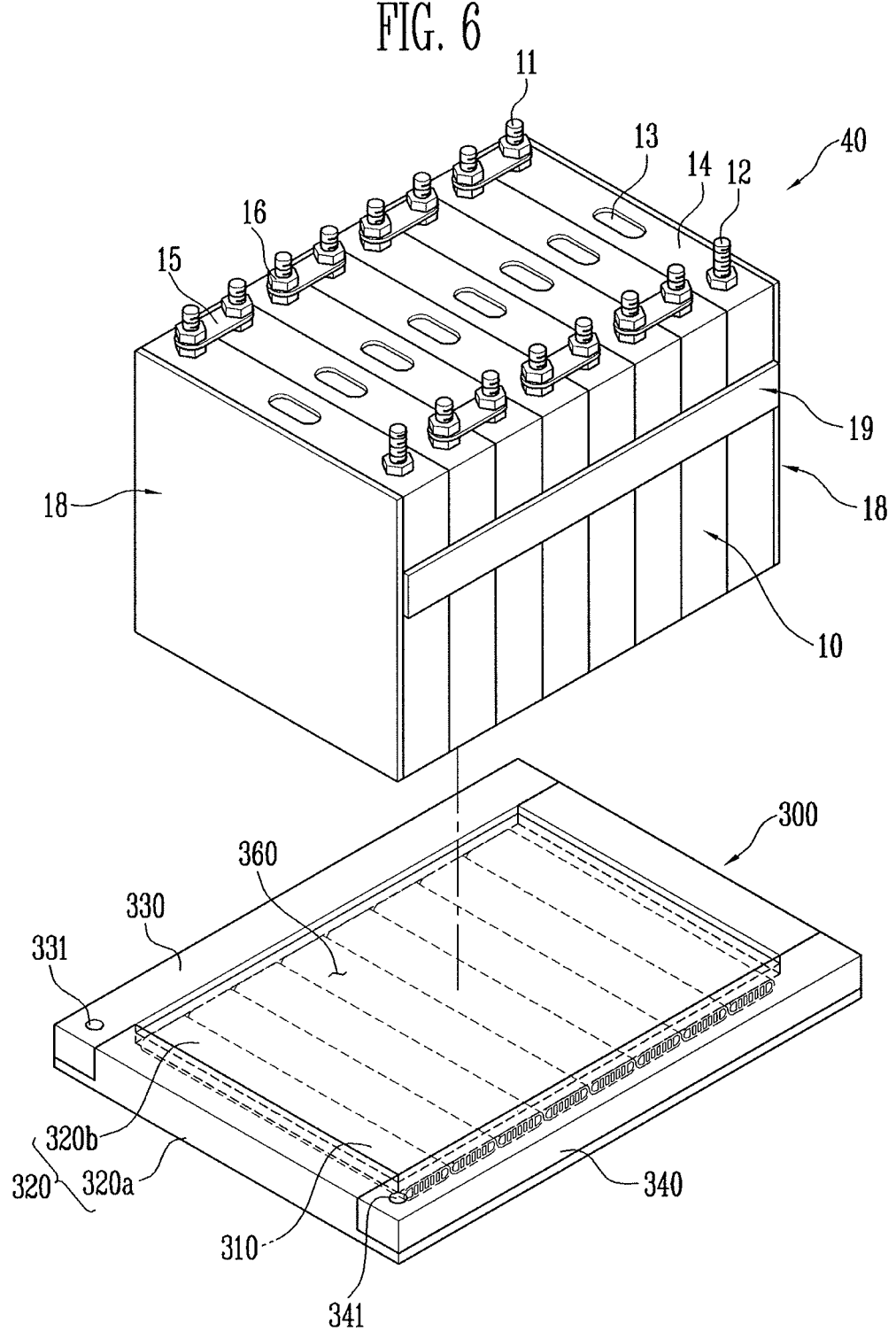
FIG. 6 illustrates an exploded perspective view of the battery module in FIG. 5.
Figure 7:
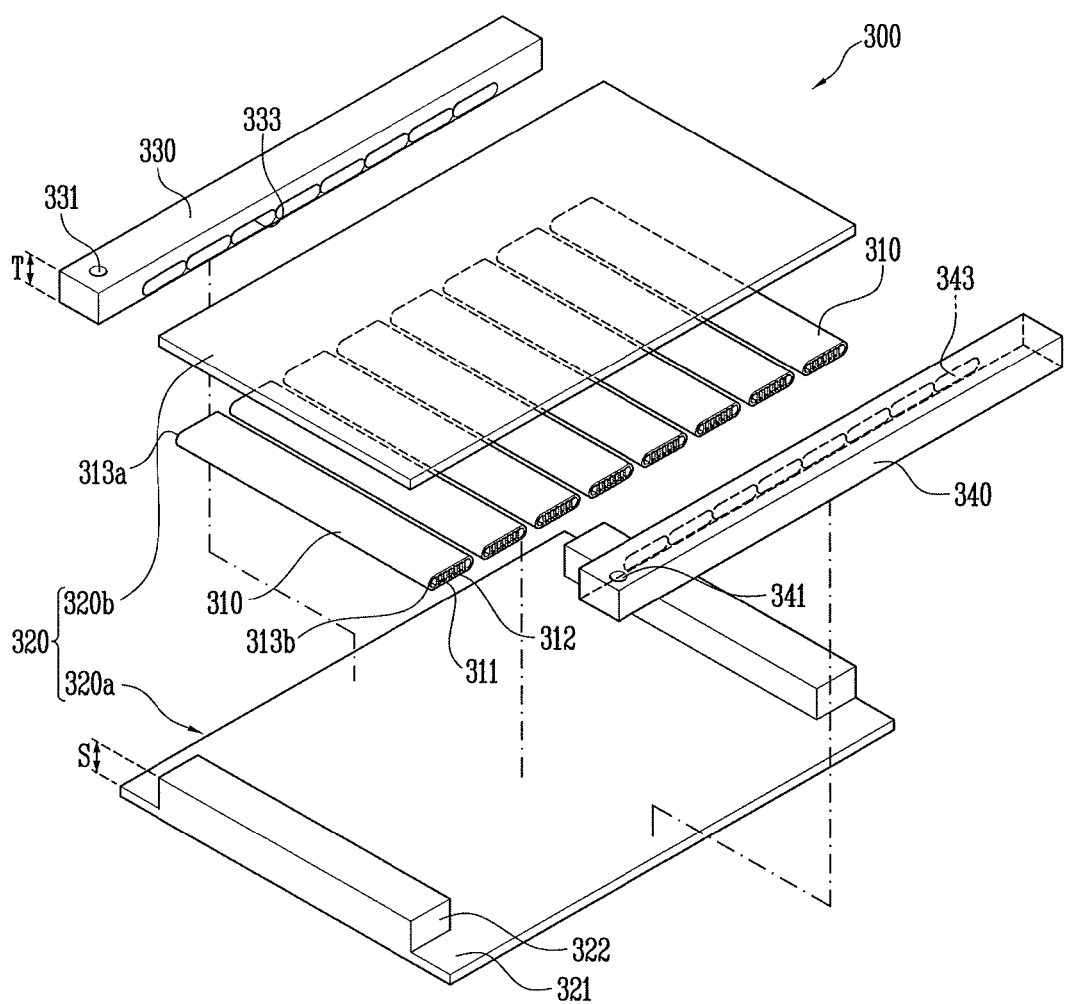
FIG. 7 illustrates an exploded perspective view showing the heat exchanging member of FIG. 5.

FIG. 5 illustrates a perspective view of a battery module, according to another exemplary embodiment. FIG. 6 illustrates an exploded perspective view of the battery module in FIG. 5. FIG. 7 illustrates an exploded perspective view showing the heat exchanging member of FIG. 5.

Referring to FIGS. 5 to 7, the battery module 40 may include the plurality of battery cells 10 and a heat exchanging member 300 adjacent to the plurality battery cell 10. The heat exchanging member 300 may include at least one tube 310, a frame member 320 covering the tube 310, a first buffer portion 330, and a second buffer portion 340. In addition, the heat exchanging member 300, according to an exemplary embodiment, may include a compartment portion 360 for accommodating the battery cells 10.

The compartment portion 360 may be provided to receive each of the battery cells 10. For example, each of the battery cells 10 may be seated inside the compartment portion 360 so that sidewalls of the compartment portion 360 surround lower portions of sidewalls of the battery cells 10 along the width direction. The compartment portion 360 may be provided to support the bottom surfaces 17 of the battery cells 10 and to cover surfaces of the battery cells 10 at the ends of the battery module 40.

The frame 320 may include a first frame member 320a provided to support the tube 310 and a second frame member 320b provided between the battery cell 10 and the tube 310. The first frame 320a may be a lower member of the frame 320, e.g., to form an outermost surface of the heat exchanging member 300. The second frame member 320b may be an upper frame member. Alternatively, the second frame member 320b may be excluded, e.g., a filler may be used between the battery cell 10 and the tube 310.

The compartment portion 360 may be provided in the heat exchanging member 300 so as to be defined by the first and second buffer portions 330 and 340 and the first frame member 320a, e.g., the lateral sides of the compartment portion 360 may be defined by the first buffer portion 330, the second buffer portion 340, and the first frame member 320a. A bottom of the compartment portion 360 may be defined by the second frame member 320b.

The first frame 320a may include a base portion 321 provided to support a lower portion of the battery cell 10 and to support the tube 310. The base portion 321 may have formed thereon, e.g., integrally formed thereon, a pair of supporting portions 322. The pair of supporting portions 322 may be formed on opposing ends of the base portion 321 and may project in parallel with an arranging direction of the battery cells 10 and the tubes 310. For example, each of the tubes 310 may be arranged in parallel to each other between the pair of supporting portions 322. The pair of supporting portions 322 of the first frame 320a may define lateral sides of the compartment portion 360.

The first buffer portion 330 having an inlet 331 and the second buffer portion 340 having an outlet 341 may be provided at opposing sides on the first frame member 320a. The first and second buffer portions 330 and 340 may vertically abut the first frame member. The first and second buffer portions 330 and 340 may be provided so that the first and second opening portions 333 and 343 are connected, e.g., attached or adhered to, to the one end 313a and the other end 313b, respectively, of the tube 310. Therefore, the first and second opening portions 333 and 343 may be provided in a lower portion of the first and second buffer portions 330 and 340, respectively, to abut the tube 310. The first and second buffer portions 330 and 340 may be provided at, e.g., directly on, the base portion 321 and may be provided to horizontally abut each of the pair of supporting portions 322.

According to an exemplary embodiment, the pair of supporting portions 322 may be formed at lateral ends of the heat exchanging member 300 in place of ones of the tubes 310 so that the tubes 310 are substantially only formed under the battery cells 10, e.g., are excluded in areas surrounding the battery cells 10. The battery cells 10 may be in a non-overhanging relationship with the pair of supporting portions 322 so that portions of the battery cells 10 are not arranged in a region above the pair of supporting portions 322. Accordingly, the pair of supporting portions 322 together with the first and second buffer portions 330 and 340 may define an uppermost frame of the heating exchanging member 300.

A height S of the pair of supporting portions 322 on the base portion 321 may be provided to correspond to a height T of the first and second buffer portions 330 and 340. The height T of the first and second buffer portions 330 and 340 may be greater than that of a sum of a height of the tube 310 together with a height of the second frame 320b.

The second frame member 320b may be provided to abut an upper portion of the first and second buffer portions 330 and 340. Due to the placement of the compartment portion 360, the battery cells 10 may abut the upper portion of the first and second buffer portions 330 and 340. The first and second buffer portions 330 and 340, the pair of supporting portions 322, and the second frame member 320b may define the compartment portion 360, which is a space in which the battery cells may be seated.

According to an exemplary embodiment, the compartment portion 360 may easily facilitates alignment of battery cells 10 provided on the heat exchanging member 300 and may fix the battery cells 10. According to another exemplary embodiment, the compartment portion 360 may be excluded while still forming the pair of supporting portions 322.

Figure 8:
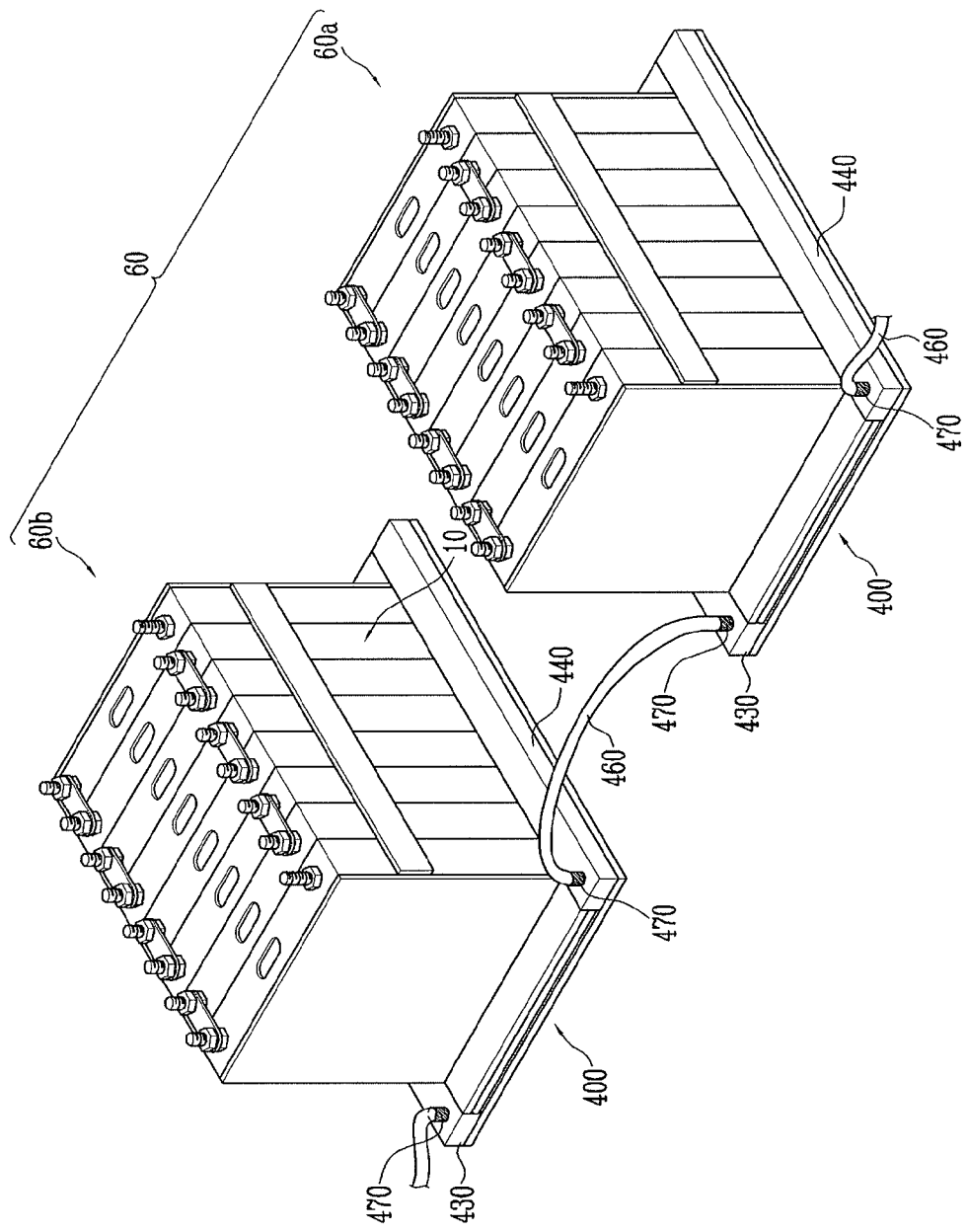
FIG. 8 illustrates a perspective view of a plurality of battery modules, according to an exemplary embodiment.

FIG. 8 illustrates a perspective view of a plurality of battery modules, according to an exemplary embodiment.

Referring to FIG. 8, the battery module 60 may include a plurality of battery modules connected in series, e.g., connected in series via connections for sharing heat exchanging medium. For example, the battery module 60 may include first and second battery modules 60a and 60b therein. An outlet of one of the first and second battery modules 60a and 60b may be in communication with an inlet of the other of the first and second battery modules 60a and 60b via a connection member. The inlet and outlet may define a passage of the heat exchanging medium between the first and second battery modules 60a and 60b.

The first and second battery modules 60a and 60b may each include a least one battery cell 10 therein and a heat exchanging member 400 adjacent to the battery cell 10. Each of the heat exchanging members 400 may include first and second buffer portions 430 and 440. Each of the first and second buffer portions 430 and 440 may include one of the inlet and the outlet. For example, the outlet provided in the second buffer portion 440 of the first battery module 60a may be in fluid communication with a connecting member 460 that is also in fluid communication with the inlet provided in the first buffer portion 430 of the second battery module 60b. Fastening portions 470 may be provided between the inlet and the outlet. For example, each fastening portion 470 may be adjacent to an inlet or an outlet.

The outlet in the second buffer portion 440 of the first battery module 60a may correspond to an outlet for heating exchanging medium leaving tubes (not shown) formed in the heat exchanging member 400 coupled to the first battery module 60a. The inlet in the first buffer portion 430 of the second battery module 60b may correspond to an inlet for heating exchanging medium that is entering tubes (not shown) formed in the heat exchanging member 400 coupled to the second battery module 60b.

By way of summation and review, a battery module having a cooling function may include a cooling plate. An internal structure of the cooling plate relates to providing uniform heat transfer with a battery module coupled thereto through a heat transfer area of the cooling plate and to minimizing a differential pressure of an operating fluid of the battery module.

Exemplary embodiments relate to applying extrusion tubes, e.g., parallel flow tubes formed of a metal such as aluminum. Using extrusion tubes may reduce development cost of the battery module. For example, the cost burden may be reduced by applying the extrusion tubes in a manner such that a development of additional flow channels may not be necessary. Further, embodiments relate to providing an enhanced heat transfer performance. In addition, a flow rate of the operating fluid may be reduced based on the improved heat transfer performance and thus a pump capacity may also be reduced.

As described above, exemplary embodiments relate to providing a heat exchanging member including a heat exchanging member. Exemplary embodiments also relate to providing a battery module having a reduced production cost and improved process efficiency.

A surface of the heat exchanging member, e.g., a lower surface facing the outside of the battery module, may be covered with an integral type insulator, e.g., so that an exposure of metal within the case is prevented, to provide a battery module having improved safety. In addition, improved productivity and a reduction in quality variation may be achieved by forming the insulator on various parts as an integrally formed continuous insulating member.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
a plurality of battery cells; and
a heat exchanging member adjoining the plurality of battery cells in heat exchanging relationship therewith, the heat exchanging member including
a plurality of tubes arranged therein, and each tube defining a plurality of heat exchanging medium flow passageways therein, each of the plurality of tubes includes lateral sides that are aligned with respective lateral sides of one of the plurality of battery cells, each one of the plurality of tubes corresponds to a respective battery cell, at least one of the lateral sides of each of the plurality of tubes contacts at least one of lateral sides of another tube adjacent thereto, and
a frame member including
a lower frame member arranged adjacent to first sides of the plurality of tubes, and
an upper frame member arranged between the plurality of battery cells and second sides of the plurality of tubes, the second sides opposing the first sides of the plurality of tubes, the plurality of tubes positioned between the lower and upper frame members, wherein:
each of the plurality of tubes includes an upper surface having a first area and facing a bottom surface of a respective battery cell, the bottom surface having a second area, the first area substantially equals the second area, and the bottom surface of the respective battery cell is superimposed on the area of the upper surface.

2. The battery module as claimed in claim 1, wherein the lower frame member includes a plastic and the upper frame member includes a metal.

3. A battery module comprising:
a plurality of battery cells;
a heat exchanging member adjoining the plurality of battery cells in heat exchanging relationship therewith, the heat exchanging member including a plurality of tubes arranged therein, each tube defining a plurality of heat exchanging medium flow passageways therein, and each of the plurality of tubes including lateral sides that are aligned with respective lateral sides of one of the plurality of battery cells, each one of the plurality of tubes corresponds to a respective battery cell, at least one of the lateral sides of each of the plurality of tubes contacts at least one of lateral sides of another tube adjacent thereto;
a member accommodating the plurality of tubes therein; and
a filler covering the plurality of tubes and the member, the filler being arranged between the plurality of battery cells and the plurality of tubes, wherein:
each of the plurality of tubes includes an upper surface having a first area and facing a bottom surface of a respective battery cell, the bottom surface having a second area, the first area substantially equals the second area, and the bottom surface of the respective battery cell is superimposed on the area of the upper surface.

4. The battery module as claimed in claim 1, wherein the heat exchanging member further includes:
a first buffer portion connected to first ends of the plurality of the plurality of tubes, and
a second buffer portion connected to second ends of the plurality of the tubes, the second ends opposing the first ends.

5. The battery module as claimed in claim 4, wherein the frame member is arranged between the first buffer portion and the second buffer portion.

6. The battery module as claimed in claim 4, wherein:
the first buffer portion includes a heat exchange medium inlet connected to the plurality of heat exchanging medium flow passageways of each of the plurality of tubes, and
the second buffer portion includes a heat exchange medium outlet connected to the plurality of heat exchanging medium flow passageways of each of the plurality of tubes.

7. The battery module as claimed in claim 4, wherein:
the first buffer portion includes a plurality of first openings and each of the first openings corresponds to one of the plurality of tubes, and
the second buffer portion includes a plurality of second openings and each of the second openings corresponds to one of the plurality of tubes.

8. The battery module as claimed in claim 4, wherein the plurality of battery cells are arranged in a region between the first buffer portion and the second buffer portion, and the plurality of battery cells overlap the plurality of tubes.

9. The battery module as claimed in claim 1, wherein the plurality of battery cells are arranged along a first direction and the plurality of tubes are arranged along the first direction, and each of the battery cells overlaps one of the plurality of tubes.

10. The battery module as claimed in claim 9, wherein:
the plurality of tubes have an elliptical shape, and
a width of a lower surface of each of the plurality of battery cells is substantially equal to a width of each of the plurality of tubes.

11. The battery module as claimed in claim 1, wherein the plurality of heat exchanging medium flow passageways in each tube are defined by at least one partition therein.

12. The battery module as claimed in claim 11, wherein each tube and the at least one partition therein has a one piece integral construction.

13. The battery module as claimed in claim 11, wherein:
the plurality of battery cells are arranged adjacent to each other along a first direction,
the plurality of tubes are arranged adjacent to each other along the first direction, and
the at least one partition is one of a plurality of partitions and the plurality of partitions are arranged adjacent to each other along the first direction.

14. The battery module as claimed in claim 1, wherein:
the lower frame member includes support portions on opposing sides thereof, the plurality of tubes being arranged between the support portions, and
the plurality of battery cells are arranged above the plurality of tubes and are arranged in a non-overhanging relationship with the support portions.

15. The battery module as claimed in claim 1, wherein the upper frame member directly contacts the plurality of tubes, and the upper frame member directly contacts a lower surface of each of the plurality of battery cells or directly contacts a filler on the lower surface of each of the plurality of battery cells.

16. The battery module as claimed in claim 1, wherein:
the plurality of battery cells overlap upper surfaces of the plurality of tubes, and
the heat exchanging member includes a first buffer portion and a second buffer portion, the frame member and the plurality of tubes being arranged between the first and second buffer portions, and the first and second buffer portions being adjacent to each of the plurality of battery cells.

17. The battery module as claimed in claim 1, wherein:
the heat exchanging member further includes a compartment portion recessed from an upper surface of the heat exchanging member, the plurality of battery cells being seated within the compartment portion,
the plurality of tubes are arranged under the compartment portion, and
a first buffer portion and a second buffer portion of the heat exchanging member surround the compartment portion, the first and second buffer portions defining the upper surface of the heat exchanging member.

* * * * *